United States Patent
Verde et al.

(10) Patent No.: US 10,843,602 B2
(45) Date of Patent: Nov. 24, 2020

(54) SEAT FOR VEHICLES HAVING AN ENGAGEMENT EDGE

(71) Applicant: PROMA S.P.A., S. Nicola la Strada (IT)

(72) Inventors: Carlo Verde, Giugliano (IT); Luca Pino, Turin (IT)

(73) Assignee: PROMA S.P.A., S. Nicola la Strada (CE) (IT)

( * ) Notice: Subject to any disclaimer, the term of this patent is extended or adjusted under 35 U.S.C. 154(b) by 0 days.

(21) Appl. No.: 16/337,200

(22) PCT Filed: Sep. 25, 2017

(86) PCT No.: PCT/IB2017/055794
§ 371 (c)(1),
(2) Date: Mar. 27, 2019

(87) PCT Pub. No.: WO2018/060825
PCT Pub. Date: Apr. 5, 2018

(65) Prior Publication Data
US 2019/0225127 A1    Jul. 25, 2019

(30) Foreign Application Priority Data

Sep. 27, 2016    (IT) .................. 102016000096583
May 19, 2017    (IT) .................. 102017000054500

(51) Int. Cl.
*B60N 2/58*        (2006.01)
*B60N 2/68*        (2006.01)
(Continued)

(52) U.S. Cl.
CPC ............. *B60N 2/682* (2013.01); *B21D 22/26* (2013.01); *B21D 53/88* (2013.01); *B60N 2/20* (2013.01);
(Continued)

(58) Field of Classification Search
CPC ...... B60N 2/20; B60N 2/5816; B60N 2/5825; B60N 2/5841; B60N 2/686; B60N 2/7011
(Continued)

(56) References Cited

U.S. PATENT DOCUMENTS 3,981,534 A * 9/1976 Wilton .................. B60N 2/5883
297/218.1
4,147,336 A    4/1979 Yamawaki et al.
(Continued)

FOREIGN PATENT DOCUMENTS

DE    42 22 222 A1    1/1994
WO    87/05480 A1    9/1987

OTHER PUBLICATIONS

International Search Report and Written Opinion from International Application No. PCT/IB2017/055794, dated Nov. 10, 2017.

*Primary Examiner* — Rodney B White
(74) *Attorney, Agent, or Firm* — Merchant & Gould P.C.

(57) ABSTRACT

A seat for vehicles, in particular motor vehicles, with separate backrest and seat base, includes a seat base and a backrest. The seat base is separate from the backrest, and the seat base is constrained to the backrest so that the backrest base can rotate relative to the seat base. The seat base and backrest are each manufactured as one piece of metallic material in a single cold-molding process. At least one of the seat base and backrest includes an engagement edge configured for engaging, via mechanical interference, with a cover for the seat in order to retain the cover.

12 Claims, 5 Drawing Sheets

(51) Int. Cl.
*B60N 2/70* (2006.01)
*B21D 22/26* (2006.01)
*B21D 53/88* (2006.01)
*B60N 2/20* (2006.01)

(52) U.S. Cl.
CPC ......... *B60N 2/5816* (2013.01); *B60N 2/5825* (2013.01); *B60N 2/5841* (2013.01); *B60N 2/686* (2013.01); *B60N 2/7011* (2013.01)

(58) Field of Classification Search
USPC ......... 297/218.1, 218.2, 218.3, 218.4, 218.5, 297/452.12, 452.14, 452.18, 452.2, 297/452.21, 452.22, 452.23, 452.24, 297/452.25, 452.26, 452.27, 452.33, 297/452.34, 452.35, 452.36, 452.29, 297/452.31, 452.32, 452.55, 452.56
See application file for complete search history.

(56) References Cited

U.S. PATENT DOCUMENTS

| | | | | |
|---|---|---|---|---|
| 4,509,796 | A * | 4/1985 | Takagi | B60N 2/0705 297/452.55 |
| 4,585,273 | A * | 4/1986 | Higgs | B60N 2/68 297/452.18 |
| 4,673,215 | A * | 6/1987 | Yokoyama | B60N 2/165 297/452.18 X |
| 4,726,623 | A * | 2/1988 | Kazaoka | B60N 2/70 297/452.55 X |
| 4,781,417 | A * | 11/1988 | Shipman | B60N 2/686 297/452.24 |
| 5,328,248 | A * | 7/1994 | Nishiyama | B60N 2/071 297/452.18 |
| 5,462,339 | A * | 10/1995 | Schmale | B60N 2/4263 297/452.18 X |
| 5,522,645 | A * | 6/1996 | Dahlbacka | B60N 2/686 297/452.55 |
| 5,697,670 | A * | 12/1997 | Husted | B60N 2/4221 297/452.18 X |
| 5,782,537 | A * | 7/1998 | Leistra | B60N 2/0232 297/452.18 X |
| 5,971,478 | A | 10/1999 | Hurite | |
| 5,988,757 | A * | 11/1999 | Vishey | B60N 2/23 297/452.18 X |
| 6,027,171 | A * | 2/2000 | Partington | B60N 2/0232 297/452.18 |
| 6,036,266 | A | 3/2000 | Massara | |
| 6,213,557 | B1 * | 4/2001 | Aebischer | A47C 7/185 297/452.55 |
| 6,286,903 | B1 * | 9/2001 | Proux | A47O 7/18 297/452.55 X |
| 6,607,247 | B2 * | 8/2003 | Becker | B60N 2/4228 297/452.18 |
| 7,303,229 | B2 * | 12/2007 | Fujita | A47C 7/14 297/452.18 X |
| 8,371,655 | B2 * | 2/2013 | Nonomiya | B60N 2/4228 297/452.18 X |
| 8,540,318 | B2 * | 9/2013 | Folkert | B60N 2/686 297/452.14 X |
| 8,590,978 | B2 * | 11/2013 | Jaranson | B60N 2/7011 297/452.14 X |
| 8,827,370 | B2 * | 9/2014 | Muhlenbrock | B60N 2/682 297/452.18 X |
| 8,894,154 | B2 * | 11/2014 | Kulkarni | B60N 2/682 297/452.18 X |
| 9,004,437 | B2 * | 4/2015 | Yamada | B60N 2/682 248/429 |
| 9,039,094 | B2 * | 5/2015 | Yamada | B60N 2/682 297/452.18 |
| 9,073,469 | B2 * | 7/2015 | Fujikawa | B60N 2/72 |
| 9,308,846 | B2 * | 4/2016 | Sugiyama | B60N 2/7094 |
| 9,376,043 | B2 * | 6/2016 | Medoro | B60N 2/686 |
| 9,440,570 | B2 * | 9/2016 | Fushikida | B60N 2/682 |
| 9,649,963 | B2 * | 5/2017 | Line | B60N 2/7005 |
| 9,663,008 | B2 * | 5/2017 | Akutsu | B60N 2/682 |
| 9,845,032 | B1 * | 12/2017 | Line | B60N 2/5858 |
| 2003/0042783 | A1 * | 3/2003 | Potes | A47O 7/282 297/452.56 |
| 2005/0168040 | A1 * | 8/2005 | Goosen | B60N 2/7011 297/452.1 |
| 2005/0168041 | A1 * | 8/2005 | Glance | B60N 2/68 297/452.18 |
| 2006/0138830 | A1 | 6/2006 | Liu | |
| 2008/0277987 | A1 * | 11/2008 | Deadrick | B60N 2/686 297/352 |
| 2011/0298269 | A1 * | 12/2011 | Mizobata | B60N 2/72 297/452.18 |
| 2012/0193965 | A1 * | 8/2012 | Saveski | B60N 2/686 297/452.18 |
| 2012/0299359 | A1 * | 11/2012 | Abe | B60N 2/70 297/452.56 |
| 2013/0193737 | A1 * | 8/2013 | Morimoto | B60N 2/68 297/452.18 |
| 2013/0320742 | A1 * | 12/2013 | Murolo | B60N 2/682 297/452.18 |
| 2013/0334862 | A1 * | 12/2013 | Gibbs | B60N 2/68 297/452.18 |
| 2014/0284987 | A1 * | 9/2014 | Yasuda | B60N 2/686 297/452.18 |
| 2015/0091338 | A1 * | 4/2015 | Hayashi | B60N 2/72 297/452.18 X |
| 2015/0097404 | A1 * | 4/2015 | Furuta | B60N 2/1615 297/452.18 X |
| 2015/0210194 | A1 * | 7/2015 | Furuta | B60N 2/7094 297/452.18 X |
| 2015/0224899 | A1 * | 8/2015 | Menne, III | B60N 2/914 297/452.18 X |
| 2015/0224901 | A1 * | 8/2015 | Furuta | B60N 2/809 297/452.18 |
| 2016/0096461 | A1 * | 4/2016 | Coppuck | B60N 2/68 297/354.1 |
| 2016/0200232 | A1 * | 7/2016 | Tamura | B60N 2/80 297/452.18 |
| 2016/0221485 | A1 * | 8/2016 | Harris | B32B 7/12 |

* cited by examiner

SEAT FOR VEHICLES HAVING AN ENGAGEMENT EDGE

CROSS REFERENCE TO RELATED APPLICATIONS

This application is a National Stage Application of International Application No. PCT/IB2017/055794, filed 25 Sep. 2017, which claims benefit of Ser. No. 102017000054500, filed 19 May 2017 in Italy and Serial No. 102016000096583, filed 27 Sep. 2016 in Italy and which applications are incorporated herein by reference. To the extent appropriate, a claim of priority is made to each of the above disclosed applications.

DESCRIPTION

Technical Field

The present invention relates to the field of seat for vehicles; in particular, it relates to a seat for vehicles with separate backrest and seat base, for terrestrial, naval, aircraft and/or railway applications.

Background Art

Seats for motor vehicles are known which are made as one piece. Such seats are typically intended for sports cars and are manufactured by injection of plastic materials and/or by using aramid fibres (e.g. carbon fibre or Kevlar).

U.S. Pat. No. 6,036,266 to Lear Corporation teaches, for example, that the seat may comprise carbon fibre, magnesium, fibreglass materials or other plastic materials.

As far as seats for road vehicles are concerned, document U.S. Pat. No. 4,147,336 to Toyota illustrates a seat frame wherein multiple seat parts can be molded together, so as to increase the productivity of the manufacturing company.

It is also known that seats for road vehicles must comply with regulations concerning their impact resistance and bearable force, especially when the vehicle in which they are installed collides with fixed objects.

In particular, seats for road vehicles comprise at least two distinct main components:
a seat base; and
a backrest;
which may possibly be complemented with additional components for more adjustment options and better comfort (such as, for example, recliners, seat lifters, active headrests, sliding guides, lumbar adjustment devices, climate control, and more).

Such seats typically have a metal frame assembled in a number of processing steps.

More in detail, the seat base is assembled from four distinct main parts: two opposite longitudinal members and two opposite transversal members. Such members, after they been welded together (typically in an automated process using robots, and with multiple spot welding or CO2 welding), form, in a plan view, a substantially rectangular structure, to which the seat backrest is then attached. The backrest also requires multiple processing steps to be fully assembled; such steps comprise at least the mutual positioning of transversal reinforcement beams and vertical supporting beams, followed by a number of distinct welding steps.

A known seat backrest is illustrated in US 2006/0138830; the document shows a vehicular seat backrest, wherein a reinforcement structure is bolted to the backrest frame. The backrest also incorporates fastening plates for further constraining the reinforcement structure to the frame.

The seats for road vehicles known in the art suffer from a few drawbacks. In particular, many molds need to be fabricated for making the various seat components, and only at a later stage the seat base and the backrest can be finally assembled.

Not least, those parts which allow supporting the user's body must then be fastened to the seat base. Typically these consist of a framework suspended on springs anchored to the two opposite longitudinal members and/or the two opposite transversal members.

This process is time-consuming and economically inefficient.

The presence of welds or other equivalent fastening means (screws and bolts, as in US 2006/0138830) creates critical points where the fastening means may fortuitously loosen or detach, resulting in seat malfunctions or, even worse, seat failures.

A partial solution to this problem is provided by Italian patent application no. TO2009A000354 by Proma S.p.A., wherein the seat base and the backrest are each manufactured as one piece of metallic material in a single cold-molding process.

However, in order to secure the cover and the padding to the backrest or to the seat base it is necessary to use fastening means created after the seat has been produced, e.g. brackets mounted on the seat base and on the backrest, whereon the cover and the padding can then be attached.

This task is disadvantageous because it leads to longer production times and increases the number of parts that need to be manufactured in order to obtain the seat.

Summary of the Invention

It is one object of the present invention to provide a seat for vehicles which can overcome this and other drawbacks of the prior art, while at the same time being simple and economical to manufacture.

According to the present invention, this and other objects are achieved through a seat for vehicles.

It is to be understood that the appended claims are an integral part of the technical teachings provided in the following detailed description of the invention.

BRIEF DESCRIPTION OF THE DRAWINGS

Further features and advantages of the present invention will become apparent from the following detailed description, which is supplied by way of non-limiting example with reference to the annexed drawings, wherein.

DETAILED DESCRIPTION OF THE INVENTION

With reference to the Figures shown herein by way of example, numeral 1 designates as a whole a seat for vehicles with separate backrest and seat base, which can be installed in vehicles, such as terrestrial vehicles, in particular cars, or boats, aircraft or railway vehicles.

Seat 1 comprises a seat base 2 and a backrest 3, wherein seat base 2 is separate from backrest 3, and wherein seat base 2 is constrained to backrest 3 so that it can rotate relative to it 2. Seat base 2 and backrest 3 are each manufactured as one piece of metallic material in a single cold-molding process.

At least one of seat base 2 and backrest 3 comprises an engagement edge 20, 30 configured for engaging, via mechanical interference, with a seat cover 8 of said seat 1 in order to retain said seat cover 8. Therefore, also engagement edge 20, 30 is made from metallic material in a single cold-molding process as one piece with seat base 2 or, respectively, with backrest 3. Preferably, both seat base 2 and backrest 3 comprise a respective engagement edge 20, 30.

When seat 1 is installed in the vehicle, the user can adjust its tilting angle via known means. Seat 1 further comprises seatings for the application of means for lifting the seat or sliding it in a direction substantially parallel to the longitudinal development of the vehicle. Said lifting or sliding mechanisms can be made by using any type of cold-molded metal.

More in detail, said metallic material is preferably high-tensile steel such as, by way of non-limiting example, FeE-34, FE P04 or DOCOL 600 DL; in particular, said three types of steel ensure optimal response in terms of strength and energy absorption during a collision. The seat according to the present invention cannot be manufactured from metallic materials that are easily subject to fracture, such as, for example, magnesium, because they react to high stresses with plastic deformation or breakage, as opposed to elastic deformation.

Seat base 2 and backrest 3 are each made as one piece in a single processing step. In particular, seat base 2 and backrest 3 are preferably manufactured by using the following cold-molding method.

In a first step, a planar steel sheet, defined on a first axis X and a second axis Y, is sheared. During this first step, in particular, central lightening holes 2a are created in seat base 2, along with optional side holes for the installation of any accessories.

In the first embodiment of seat 1 described and illustrated herein by way of example, central holes 2a in seat base 2 are circular in shape. Of course, central holes 2a shown herein may change in number and shape so that, while lightening seat base 2, they can still ensure optimal stress distribution and comfort.

During the first processing step, central lightening holes 3a are also created in backrest 3, along with optional side holes for attaching any accessories. As described in the previous paragraph, also central holes 3a in backrest 3 may change in number and shape compared to the illustrations provided herein; more in detail, their number and position will affect the weight and the stress response of backrest 3.

Subsequently, in a second processing step, the steel sheet perforated during the previous step is deep-drawn. During this processing step, seat base 2 and backrest 3 switch from a planar shape to a shape having bends also along a third axis Z distinct from the two axes X, Y that define the steel sheet plane.

Finally, in a third processing step the steel sheet of seat base 2 and backrest 3 is bent sideways, so that they will both take their final shape.

A step is also carried out for forming an engagement edge 20, 30 on the steel sheet, configured for engaging, via mechanical interference, with a cover 8 for said seat 1 in order to retain said cover 8. In particular, engagement edge 20, 30 is made during the deep-drawing step.

Figure 1:
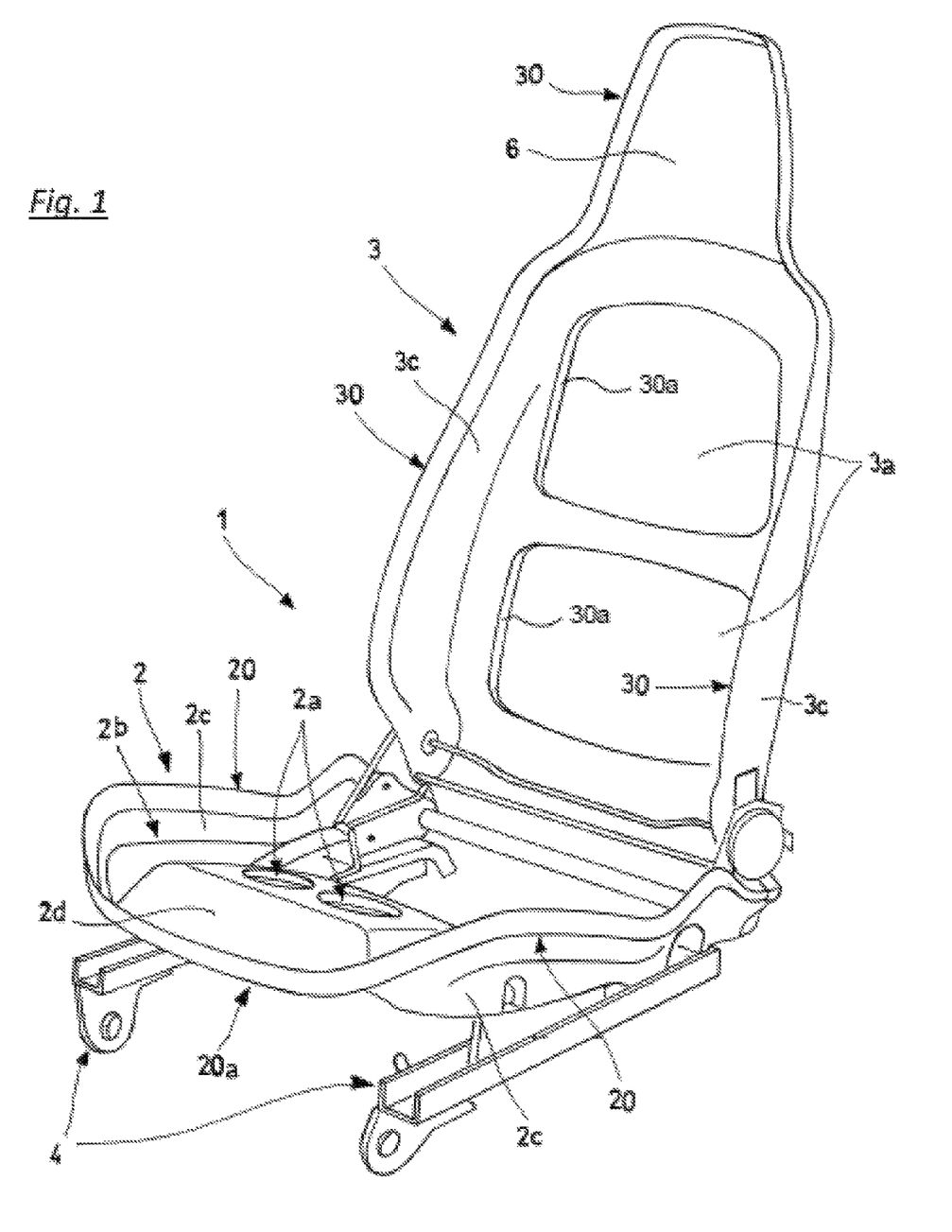
FIG. 1 is a perspective view of a seat made in accordance with an illustrative embodiment of the present invention.

As shown in FIG. 1, after the above-described processing steps seat base 2 will show a recess 2b between two side walls 2c extending at the sides thereof. At the end of recess 2b, a front portion of seat base 2 comprises a front edge 20a which is lower than engagement edges 20 of side walls 2c, so as to form an ergonomic support for the thighs of the user of seat 1. Front edge 20a is also an engagement edge, in this example joined with engagement edges 20 of side walls 2c, thus creating a continuous profile of said engagement edge 20. Front part 2d of the bottom wall of seat base 2 is convex upwards. Front part 2d ends at front edge 20a. Recess 2b includes central holes 2a, which are useful for making seat base 2 lighter.

Optionally, it is possible to make side holes in seat base 2 for attaching any external components useful for improving the comfort of the seat when in use; by way of non-limiting example, they can be used for securing the height and tilting adjustment controls of backrest 3, or the controls for sliding seat 1 along guides 4 fastened to the vehicle.

At this point, seat base 2 is ready for being coated with the cover, e.g. a layer of fabric, leather or velvet covering a padding 9; the latter is useful for improving the seating comfort, in particular in the area of recess 2b.

Backrest 3 is processed in the same way as described for seat base 2. At the end of the production cycle, backrest 3 will have a respective pair of containment walls 3c extending perpendicular to a bottom region that comprises central holes 3a (two in this example); containment walls 3c, opposite to each other on both sides of the bottom region, allow limiting the movements of a user's back, especially when the vehicle in which seats 1 is to be installed is subjected to lateral acceleration loads (e.g. when bending).

When in use, the bottom region will remain substantially parallel to the user's back; in this bottom region, central holes 3a will give some flexibility to backrest 3, while lightening it without adversely affecting its strength.

Preferably, engagement edge 20, 30 is located in a perimetric position on seat base 2 and/or on backrest 3. Engagement edge 30 of backrest 3 is located between the front face and the rear face of backrest 3. With reference to the illustrated example, engagement edge 30 of backrest 3 is a continuous profile that extends between the two side walls 3c, passing through the upper part of backrest 3 (in this example, the headrest area).

In particular, the backrest 3 comprises an upper portion 6 forming a headrest. In the preferred example illustrated herein, upper portion 6 includes engagement edge 30 along its outer perimeter. As shown in the drawing, upper portion 6 defines a cavity suitable for receiving a padding 9 for the headrest. Then, padding 9 is housed in the cavity, and cover 8 is attached to and kept under tension between engagement edges 30.

In particular, engagement edge 20, 30 has a recess 25 or a protrusion for connecting to cover 8, and possibly also to padding 9, via a male/female system. Therefore, engagement edge 20, 30 has a recess 25 or a protrusion configured for engaging with a complementary protrusion or recess of cover 8.

Figure 2:
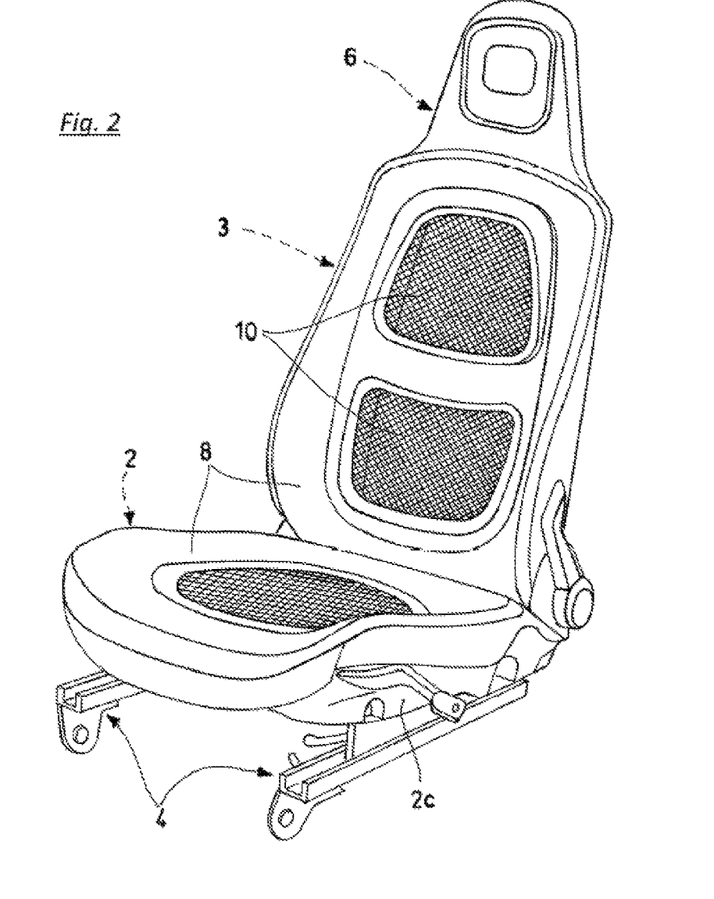
FIG. 2 is a perspective view of a seat made in accordance with an illustrative embodiment of the present invention, in a finished condition including a seat cover.
Figure 3:
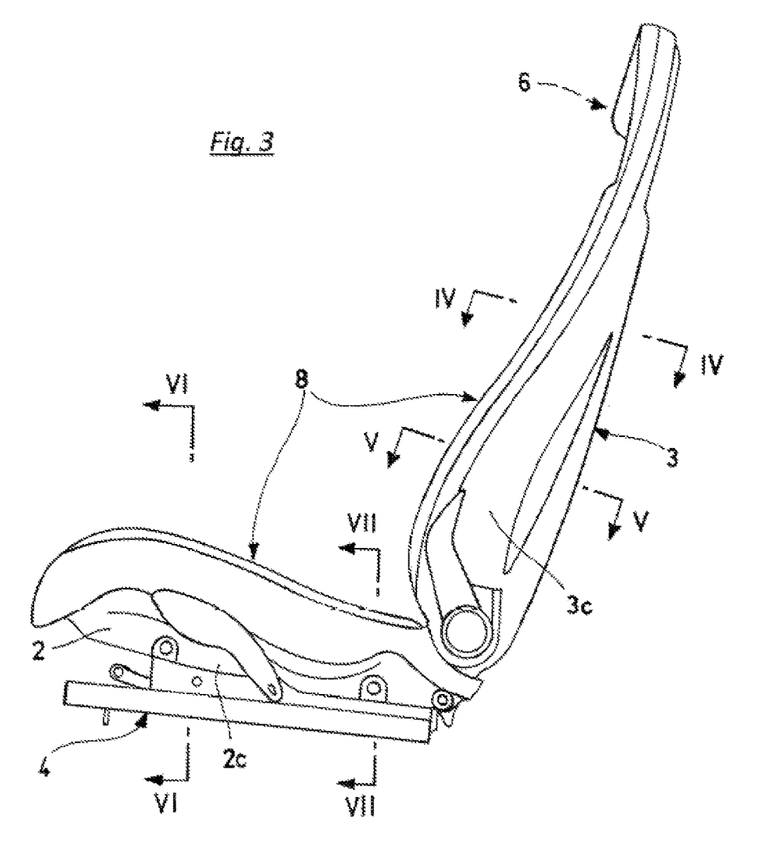
FIG. 3 is a side view of the seat of FIG. 2.

The seat shown in FIG. 2 is finished and coated with a cover 8. In particular, cover 8 of backrest 3 comprises two net inserts 10 matching central holes 3a.

Figure 4:
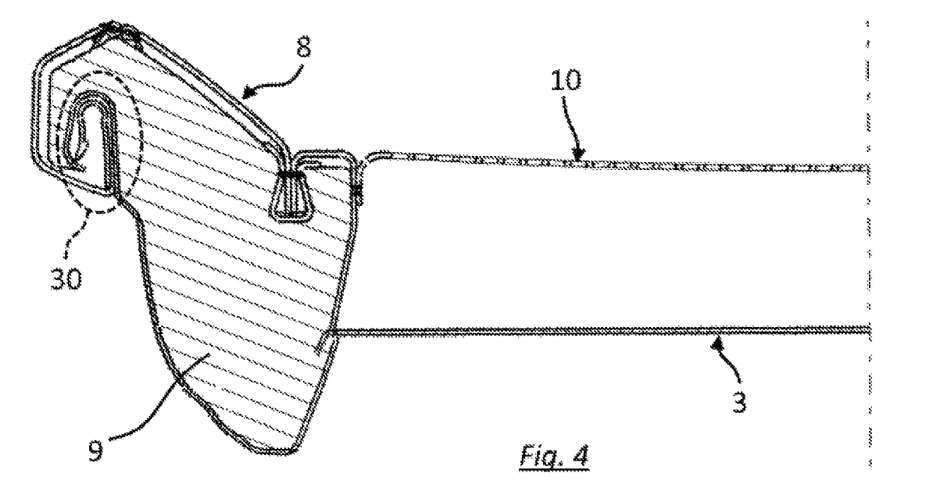
FIGS. 4 and 5 are sectional views of the backrest of the seat of FIG. 3.
Figure 5:
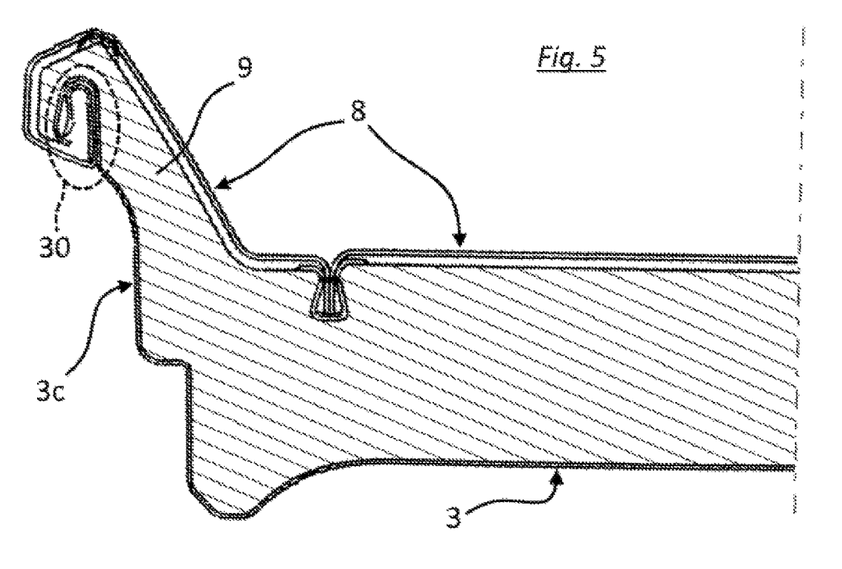
Figure 6:
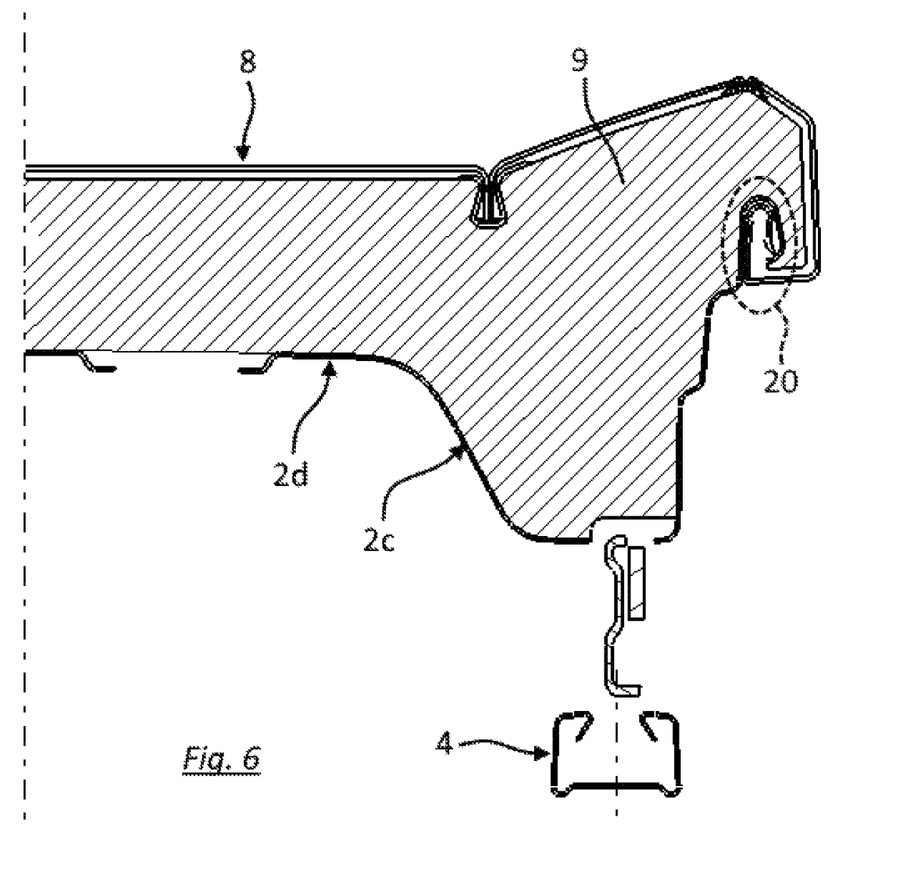
FIGS. 6 and 7 are sectional views of the seat base of the seat of FIG. 3.
Figure 7:
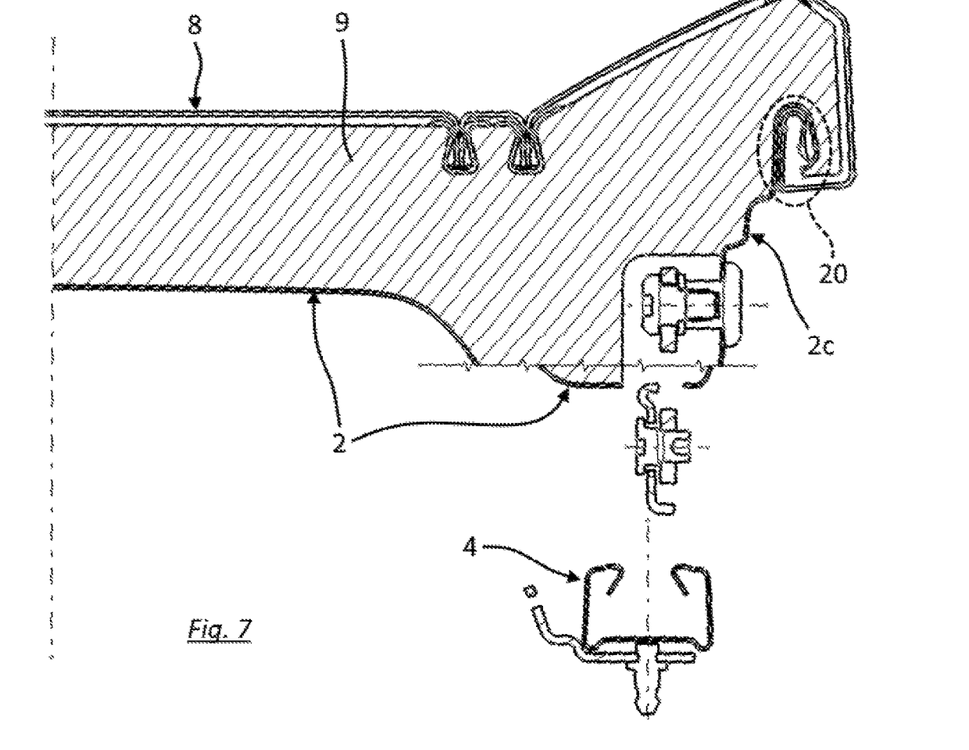
Figure 8:
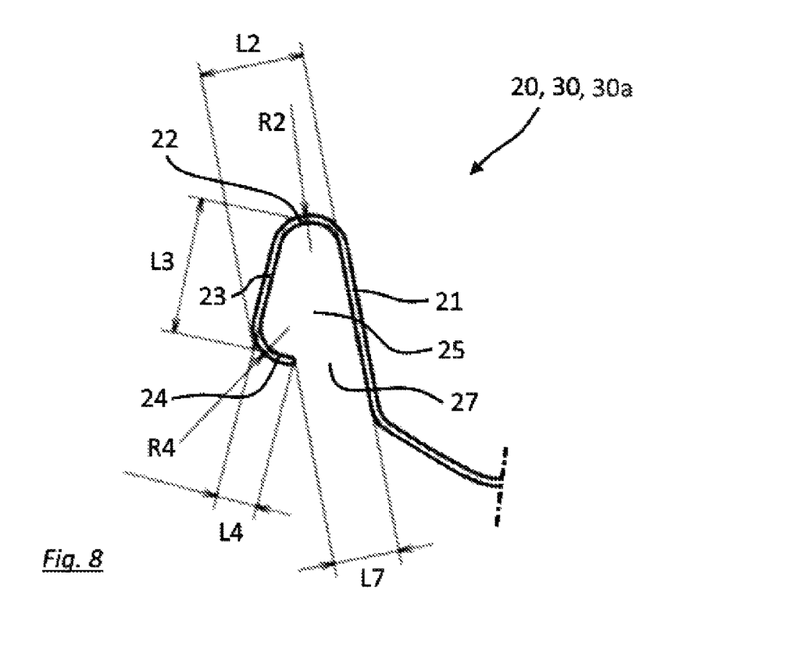
FIG. 8 is a cross-section of a particular engagement edge.

In the illustrated examples, engagement edge 20, 30 is adapted to engage with and retain cover 8. In this manner, cover 8 will remain under tension in the correct position when seat 1 is in use. Preferably, cover 8 includes and engagement portion (e.g. stitched thereto) adapted to mechanically engage with engagement edge 20, 30. With reference to FIGS. 4, 5 and 8, engagement edge 30 has a curved shape that creates a recess 25, into which a hem of cover 8 is inserted. In this example, also padding 9 encircles engagement edge 30. In FIG. 4, padding 9 ends at inserts 10; on the contrary, where there is no insert 10 (see sectional view in FIG. 5), padding 9 is interposed between backrest 3 and cover 8. Likewise, with reference to FIGS. 6 and 7, engagement edge 20 has a curved shape that creates a recess 25, into which a hem of cover 8 is inserted and fixed.

By way of example, cover 8 and padding 9 may already be joined together (e.g. by stitching or gluing) before being mounted on seat 1. The engagement portion of cover 8 may be either integral with cover 8 or associable with and removable from cover 8.

Therefore, in accordance with a preferred aspect of the invention, an additional processing step is included for mounting cover 8 on seat base 2 and/or backrest 3 by mechanically constraining cover 8 to engagement edge 20, 30.

With particular reference to the variant illustrated in FIG. 2, cover 8 only covers the front part of backrest 3, and the metal of the rear part of backrest 3 remains exposed.

In accordance with an alternative variant, backrest 3 is wrapped in the cover up to central hole 3a. In accordance with a preferred variant, there is at least one central hole 3a, in particular two central holes 3a.

Optionally, in central hole 3a a box can be mounted (e.g. through a snap coupling), which may conveniently be made of plastic, facing towards the rear side of the seat.

With reference to FIG. 8, engagement edge 20, 30 defines, with reference to a cross-section thereof, a recess 25 and comprises an outer surface having a radius of curvature of at least 2.5 mm with no sharp edges. The outer surface is that surface which faces outwards from recess 25, i.e. exposed towards the passenger compartment of the vehicle. The outer surface is rounded or smoothed, and may include flat portions. In this manner, the outer surface has no sharp corners or surfaces, and improves the safety of the users when they are in the vehicle, because the outer surface cannot cause injuries or damage to the user hitting the outer surface of engagement edge 20, 30, e.g. during an accident or sudden braking. Moreover, thanks to the present invention, it is not necessary to apply any protection elements to the outside of the seat in order to reduce the impact force against the seat, which elements, in addition to being unpleasant to see, would lead to higher production costs and times.

Preferably, the radius of curvature of the outer surface is at least 5 mm, at least in the headrest region. The longer radius of curvature in that region provides higher safety because it allows reducing the impact against the user's head, which is a particularly important body part. It is therefore possible to have different radii of curvature of the outer surfaces in the different regions of engagement edge 20, 30. For example, in the headrest region the radius of curvature is at least 5 mm, whereas in the other regions it is at least 2.5 mm. As an alternative, the radius of curvature is constant, e.g. at least 5 mm.

In accordance with one possible variant, the radius of curvature is at least 3.2 mm. Such a radius of curvature may be constant along the edge profile. As an alternative, in the headrest region the radius of curvature is at least 5 mm, whereas in the other regions it is at least 3.2 mm.

Optionally, the radius of curvature is variable along engagement edge 20, 30. Engagement edge 20, 30 is continuous and includes joined sections having different radii of curvature. For example, in the headrest region there is a section having a radius of curvature of at least 5 mm, while in the other sections the radius of curvature is at least 2.5 mm. As an alternative, engagement edge 20, 30 comprises separate sections, each section having a respective radius of curvature, e.g. at least 2.5 mm and at least 5 mm. In any case, engagement edge 20, 30 is made as one piece with backrest 3 and/or with seat base 2, as previously described.

Therefore, the present invention allows manufacturing a one-piece seat that can comply with the current regulations for vehicles, in particular the one known as ECE Regulation no. 17.

Preferably, engagement edge 20, 30 comprises, with reference to the cross-section thereof, an aperture 27 that is narrower than recess 25, for inserting into recess 25 an engagement portion associable with cover 8. The engagement portion of the cover is thus retained mechanically in recess 25 by narrower portion 27, so that the cover can be stretched around the seat. The engagement portion of cover 8 conveniently has a shape that is complementary to that of recess 25, and is adapted to fit into said recess 25 through narrower portion 27 by undergoing a deformation, typically an elastic one. This makes for a simple and quick installation.

With reference to the preferred variant illustrated herein, engagement edge 20, 30 is a sheet steel section having an inner surface facing towards recess 25 and its outer surface facing outwards.

In particular, in a sectional view engagement edge 20, 30 has a hook-like shape. More in particular, it comprises:
- a substantially straight first portion 21 in a position proximal to seat 1 (in particular, proximal to backrest 3 or to seat base 2, according to the case),
- a curved second portion 22 connected to the first portion,
- a substantially straight third portion 23 connected to the second portion 22,
- a curved terminal portion 24 connected to the third portion 23.

The two portions 22, 24 are concave towards recess 25. In particular, with reference to the non-limiting example of FIG. 8, the various elements have the following geometric characteristics: the first portion 21 is at least 20 mm long; the second and fourth portions 22 have a radius of curvature R2, R4 of approximately 5 mm; the length of the third portion 23 is approx. L3=18.5 mm; the length of the terminal portion 24 is approx. L4=5.5 mm; the width of recess 25 is approx. L2=14 mm; the width of narrower portion 27 is approx. L7=8 mm.

Advantageously, with reference to FIG. 1, along the profile of central hole 3a there is a respective engagement edge 30a. It is thus possible to constrain cover 8 to backrest 3 also at central hole 3a, as previously described with reference to engagement edges 20, 30. Cover 8 on central hole 3a may even be different from the one covering the other parts of seat 1.

Engagement edge 20, 30, 30a is made as one piece with backrest 3 and/or with seat base 2, as previously described, and can receive any type of cover 8, thus allowing different kinds of saddling without requiring any additional parts.

As aforementioned, in accordance with some possible variants of the invention, seat base 2 and/or backrest 3 expose part of the metal, and can therefore have a pleasant shape without jeopardizing the users' safety. For example, the exposed part of seat base 2 and/or of backrest 3 may be painted in the same colour as the car, or in a different colour, or be coated with decorative films.

Therefore, the present invention provides a seat that allows for easy installation of the cover on said seat, thereby reducing the seat production times and costs. In particular, it is possible to reduce the number of parts that needs to be mounted to the seat, after the latter has been manufactured by molding, in order to mount the cover. In addition, the seat is lighter.

Of course, without prejudice to the principle of the invention, the forms of embodiment and the implementation details may be extensively varied from those described and illustrated herein by way of non-limiting example, without however departing from the scope of the invention.

The invention claimed is:

1. A seat for vehicles, with separate backrest and seat base, comprising:
   a seat base, and
   a backrest;
   wherein the seat base is separate from the backrest, and wherein the seat base is constrained to the backrest so that the backrest can rotate relative to the seat base; the seat base and the backrest are each manufactured as one piece of metallic material in a single cold-molding process;
   wherein at least one of the seat base and the backrest comprises an engagement edge configured for engaging, via mechanical interference, with a cover for said seat to retain said cover, wherein the engagement edge, with reference to the cross-section thereof, defines a recess and comprises an aperture, the aperture being narrower than the recess for inserting an engagement portion of the cover into the recess; and
   wherein the engagement edge, with reference to the cross-section thereof, comprises:
   a substantially straight first portion in a position proximal to the seat,
   a curved second portion connected to the first portion,
   a substantially straight third portion connected to the second portion,
   a curved terminal portion connected to the third portion.

2. A seat according to claim 1, wherein the engagement edge comprises an outer surface having a radius of curvature of at least 2.5 mm and is free of sharp edges.

3. A seat according to claim 2, wherein the radius of curvature is at least 5 mm in the headrest region.

4. A seat according to claim 2, wherein the radius of curvature is variable along the engagement edge.

5. A seat according to claim 4, wherein the radius of curvature is at least 5 mm in the headrest region.

6. A seat according to claim 1, wherein the seat base and the backrest comprise a respective engagement edge.

7. A seat according to claim 1, wherein the engagement edge is located in a perimetric position on the seat base and/or the backrest.

8. A seat according to claim 1, wherein the backrest comprises an upper portion forming a headrest.

9. A seat according to claim 8, wherein the upper portion includes the engagement edge along an outer perimeter.

10. A seat according to claim 9, wherein the engagement edge comprises an outer surface having a radius of curvature of at least 5 mm in the headrest region.

11. A seat according to claim 8, wherein the upper portion defines a cavity adapted to receive a padding for the headrest.

12. A seat according to claim 1, wherein the backrest comprises at least one central hole, a respective engagement edge being present along the profile of said central hole.

* * * * *